(12) United States Patent
Kempf

(10) Patent No.: US 8,950,716 B2
(45) Date of Patent: Feb. 10, 2015

(54) HOIST PICKUP BAR

(71) Applicant: James Kempf, New Windsor, NY (US)

(72) Inventor: James Kempf, New Windsor, NY (US)

(73) Assignee: Production Resource Group, LLC, New Windsor, NY (US)

( * ) Notice: Subject to any disclaimer, the term of this patent is extended or adjusted under 35 U.S.C. 154(b) by 231 days.

(21) Appl. No.: 13/631,915

(22) Filed: Sep. 29, 2012

(65) Prior Publication Data

US 2013/0161477 A1    Jun. 27, 2013

Related U.S. Application Data

(60) Provisional application No. 61/541,388, filed on Sep. 30, 2011.

(51) Int. Cl.
| | |
|---|---|
| A47B 96/06 | (2006.01) |
| E04G 3/00 | (2006.01) |
| F16B 1/00 | (2006.01) |
| G09F 7/18 | (2006.01) |

(52) U.S. Cl.
USPC .............. 248/229.2; 248/229.23; 248/229.25

(58) Field of Classification Search
USPC ................... 248/229.2, 229.24, 200.1, 201
See application file for complete search history.

(56) References Cited

U.S. PATENT DOCUMENTS

| | | | | |
|---|---|---|---|---|
| 2,362,957 | A * | 11/1944 | Hackett | 606/86 R |
| 3,146,982 | A * | 9/1964 | Budnick | 248/68.1 |
| 5,334,203 | A * | 8/1994 | Wagner | 606/252 |
| 5,688,272 | A * | 11/1997 | Montague et al. | 606/252 |
| 6,238,396 | B1 * | 5/2001 | Lombardo | 606/86 A |
| 7,959,653 | B2 * | 6/2011 | Thramann et al. | 606/250 |
| 2006/0064093 | A1 * | 3/2006 | Thramann et al. | 606/61 |
| 2006/0271051 | A1 * | 11/2006 | Berrevoets et al. | 606/61 |
| 2007/0049932 | A1 * | 3/2007 | Richelsoph et al. | 606/61 |

* cited by examiner

*Primary Examiner* — Amy J Sterling
(74) *Attorney, Agent, or Firm* — Law Office of Scott C. Harris, Inc.

(57) ABSTRACT

A hoist pick up bar, which has its entire clamp system inside the footprint of the truss. A benefit of placing the hoist inside the truss allows designers to raise the truss structure itself higher since the hoist is no longer above it. In embodiments, the device has clamps that move out of the way so that the device can be lowered on to the truss.

17 Claims, 7 Drawing Sheets

HOIST PICKUP BAR

This application claims priority from provisional application No. 61/541,388, filed Sep. 30, 2011, the entire contents of which have herewith been incorporated by reference.

BACKGROUND

Trusses are often used in stage lighting applications to hold stage lights and other items as supports relative to the stage, e.g., above the stage level as supported from a supporting beam above a stage or other object of lighting.

Overhead items such as lights, winches and other overhead items, can be mounted on a truss.

Different ways of truss mounting can be desirable.

SUMMARY

An embodiment describes a truss end support that supports between open ends of trusses. According to an embodiment, this allows mounting items such as a hoist inside the outer extent of the truss.

DETAILED DESCRIPTION

An embodiment describes a hoist pick-up bar intended to mount on a truss and hold a held device inside the truss. The hoist pick up bar is designed specifically for the demands of the concert touring industry. In this embodiment, the bar holds a chain hoist inside a truss and allows the chain to be moved up and down once in operation. This allows for pre-rigging of most hoists inside the truss while preparing in the shop and then hanging the pre-rigged hoist. Using pre-rigged hoists to travel inside the truss allows all work to be done prior to site install. This can expedite time on site during load-ins and load-outs as well as tightening the truck pack.

The Pick-up Bar, when attached, is entirely inside the footprint of the truss. A benefit of placing the hoist inside the truss allows designers to raise the truss structure itself higher than would otherwise be possible with a top mounted hoist. The attached hoist can also be located entirely inside that footprint, according to an embodiment.

An embodiment is fabricated of aluminum in an embodiment and is available in three standard truss sizes—20.5-inch, 24-inch and 30-inch.

The device is used for hanging chain motors inside or under stock aluminum box trusses. It can also be flipped upside-down to attach a chain motor to lift the trusses.

Embodiments are described in the detail in the attached.

Figure 1A:
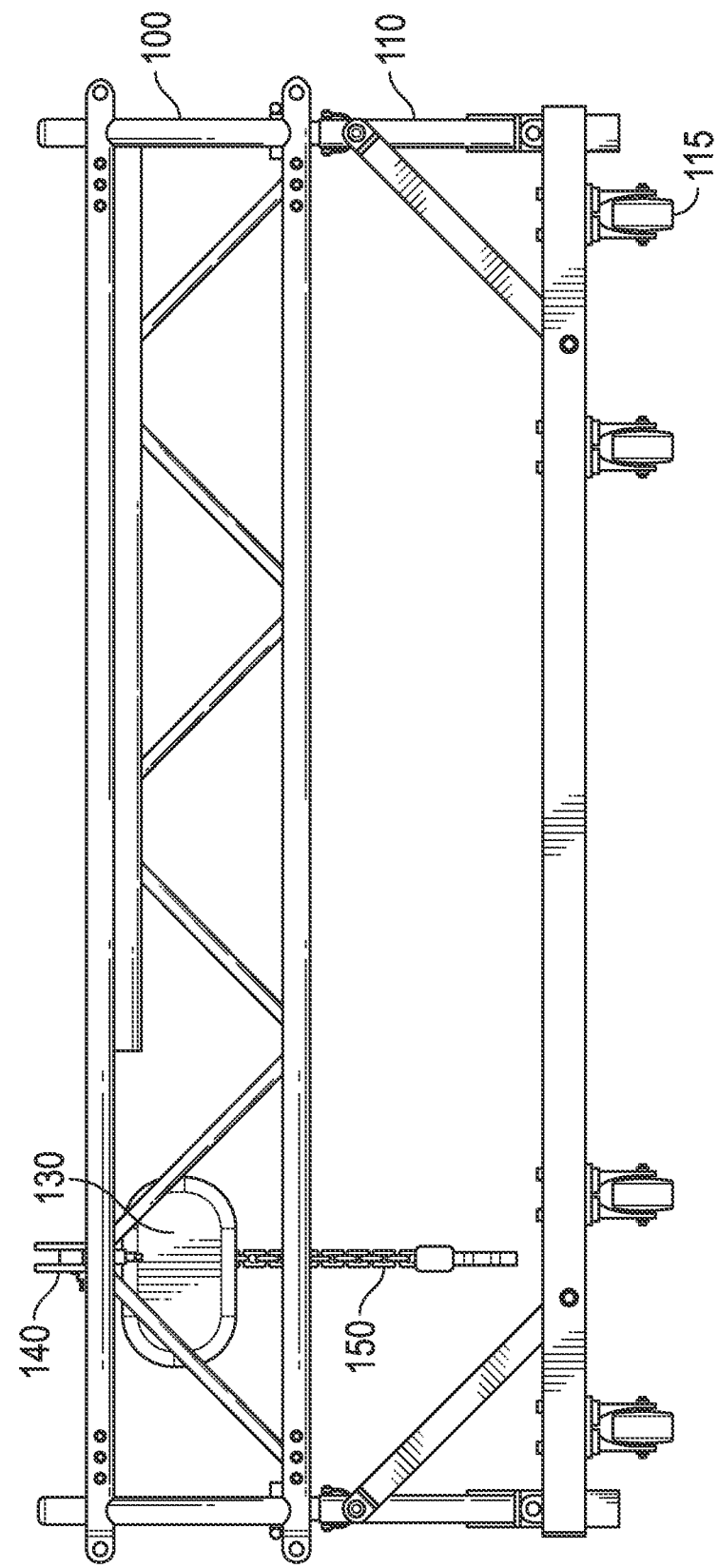
FIGS. 1A-1D shown the truss support holding a chain hoist, inside a truss, from different angles of the truss.

FIGS. 1A-1D show the device as attached/installed in a truss. FIG. 1A shows a front view of the truss assembly, including the truss, 100, which is attached to either permanently or temporarily, a truss dolly 110. The truss dolly 110 includes wheels 115 allowing moving the truss. This can be used to assemble the truss components and prepare for install.

The truss itself 100 includes spaced support bars that form the truss. The hoist pick up bar 140 is attached between two of these support bars, connected to a hoist drive 130 with a movable chain 150. FIGS. 1A, 1B and 1C and 1D show this from different angles, showing how the hoist pick up bar is attached to the truss in a way that maintains the hoist itself 130 inside the outer perimeter of the truss.

Note also that while the chain 150 is shown extending outside the outer perimeter of the truss 100, here into the area of the truss dolly 110, this chain can be contracted further so that it stays within the truss area itself, or extended so that it extends even further outside the truss.

Figure 2:
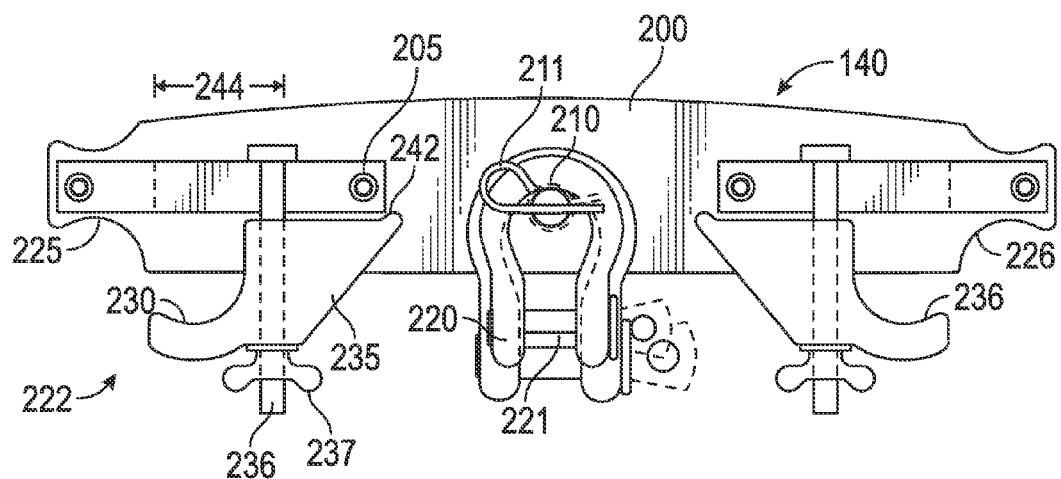
FIG. 2 shows details of the adjustable truss end support in its open position.
Figure 4:
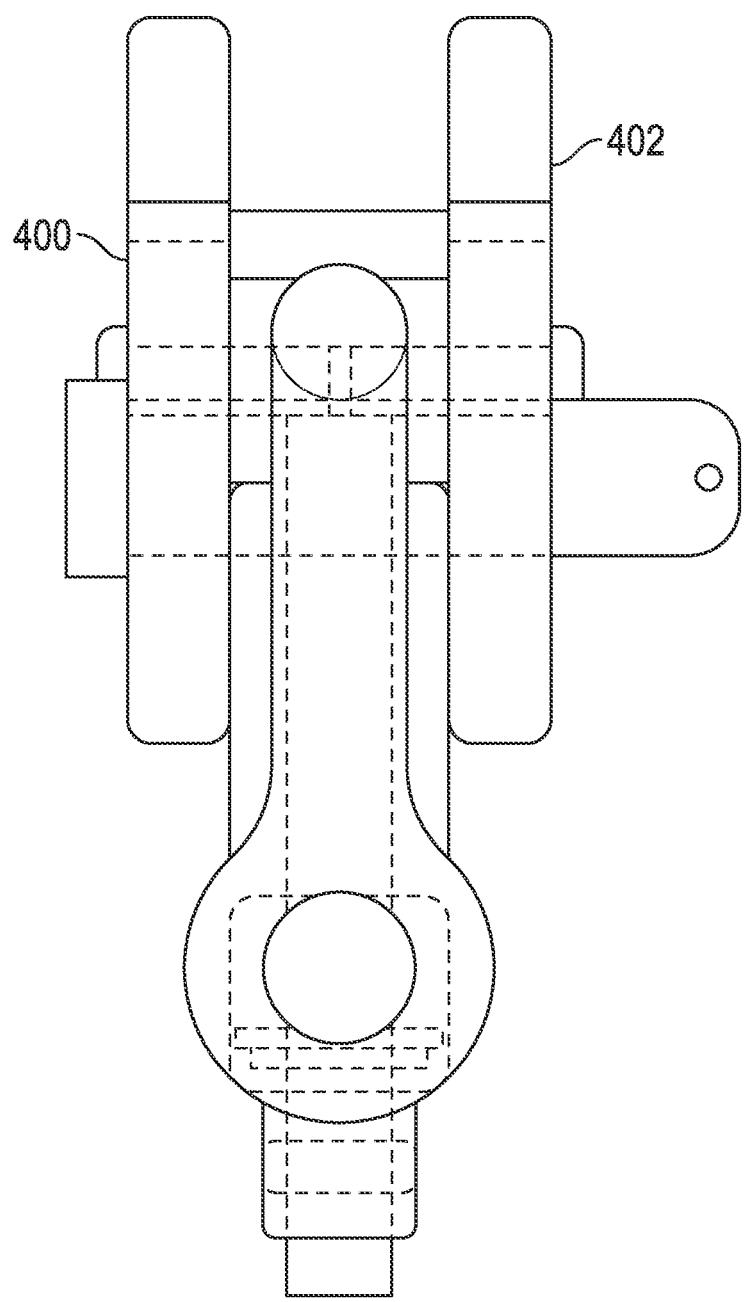
FIG. 4 shows a side view of the truss.

FIG. 2 shows a drawing of the truss pickup bar 140 in its open position, where the clamps of the pickup bar are not clamped to sides of a truss. The truss pickup bar includes a housing part 200 formed of two separated aluminum spanners or plates formed of machined aluminum plates that have first and second ends, a top surface and a bottom surface. The spanners are shown as 400, 402 in FIG. 4. These two spanners form first and second plates that are separated by a spacing device, e.g., a bolt. The spanners also include connection portions such as 205 for connecting attached parts, and also includes connection holes such as 210 for holding a loadbearing hook or other structural part, shown as 220. Many of these parts are located between the two different spanner sides 400, 402, thereby placing them in the center of gravity or off the center of the hoist pickup bar.

Each of the two sides includes a clamp attachment portion shown generally as 220. The clamp attachment portion includes a truss-engaging portions 225, 226 at opposite ends. A first curved portion 225 is formed on an outer surface of the two separated spanners. A second movable curved portion 230 is attached to and moveable relative to, the plate and the first curved portion 225. The second movable curved portion 230 is formed as part of a clamp portion 235. The clamp 235 is loosened and tightened via a threaded bolt 236 which is adjusted via a wingnut 237.

Figure 3:
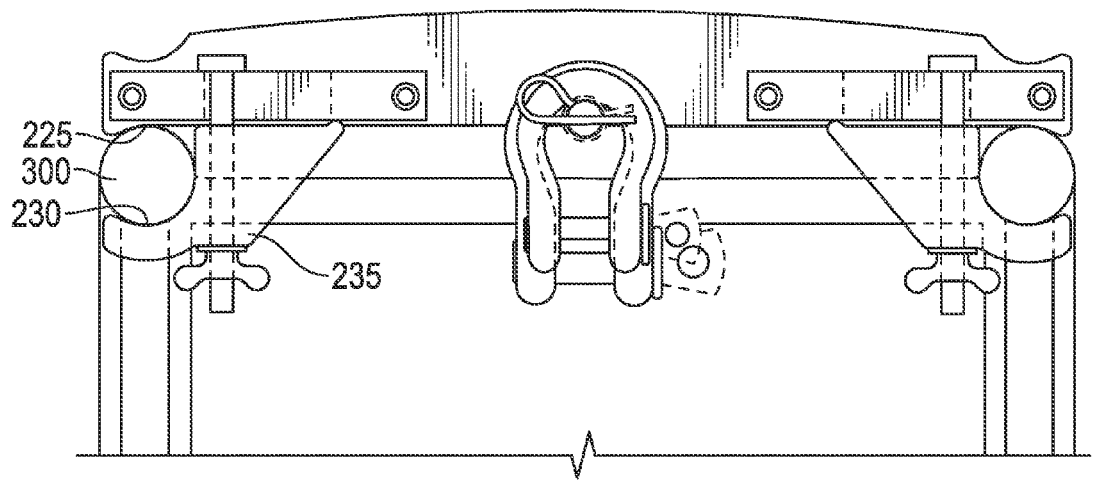
FIG. 3 shows the truss end support in its closed position, closed around supports of a truss.

When the clamp 235 is loosened, it is in the position shown in FIG. 2 with the two rounded portions 225, 230 being separated. This facilitates placing the supporting bar of the truss between the rounded portions. In this open position, the body of clamp 235 is horizontally and innerly offset from the rounded portion 225. This allows the portions 225, 226 to be lowered onto respective bars of an appropriately sized truss, e.g., the bar 300 of the truss as shown in FIG. 3. In this open position, the bottom part of the clamp can be moved horizontally, out of the way.

Once the body is located on the truss, the clamps can be moved to below the two supports of the clamp, and the wingnut 237 can be tightened to drive the clamp portion 235 and 236 towards and against the rounded portions 225, 226.

Figure 1B:
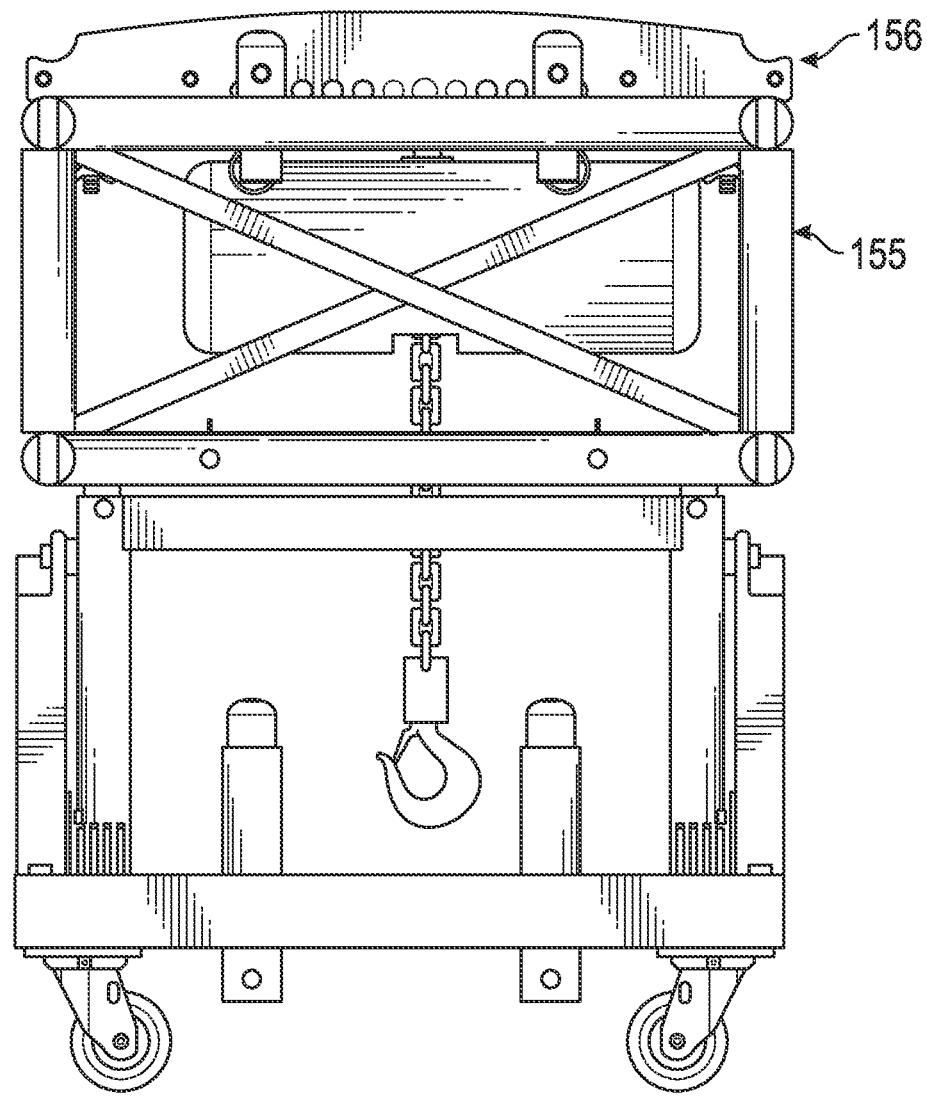
Figure 1C:
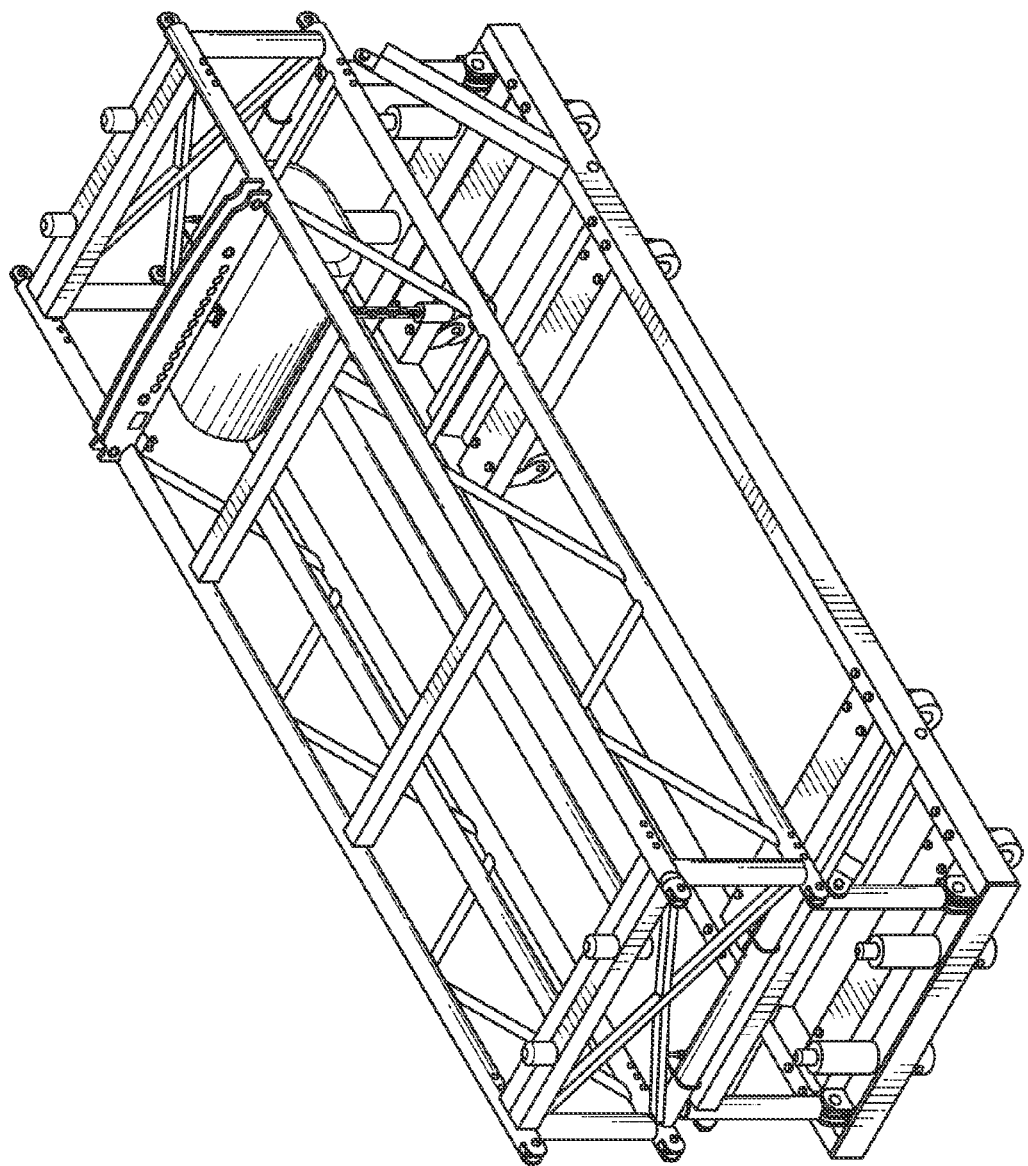
Figure 1D:
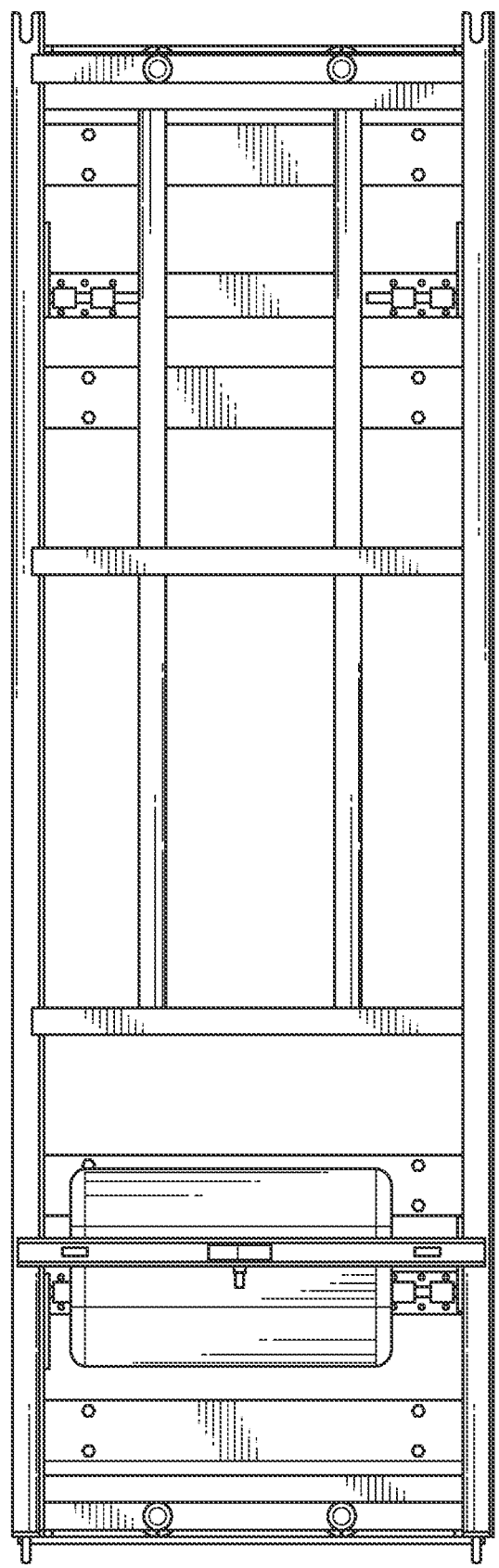

In an embodiment, each of the curved portions define less than 120° of an arc of a circle. This allows the curved portions to connect to the truss without extending outside the outer horizontal extent of the truss. For example, this is shown in FIGS. 1B and 1D, where the outer extent of the truss shown as 155 is substantially even with or slightly extended from the end 156 of the pickup bar. When clamped into place, this leaves approximately 120° or more of the truss on clamped, but prevents the pickup bar from extending outside the horizontal extent of the truss.

The holes such as 210 can also hold shackle 220 between the two spanners sides, with the shackle having a load holding portion 221 adapted to carry the chain hoist or other device. The shackle can be held in place by the bolt 210 which extends through both sides of the spanner, with the bolt terminated with a Cotter pin 211.

In operation, the clamps 235 have their rounded section 230 at one side, and at the other side includes a beveled area 242. The beveled area when tightened presses against the support along the slot area shown generally as 244, thereby even further pressing the parts into place.

The slot area 244 sliding the bolt 236 into that open position shown in FIG. 2, and then into the closed position as shown in FIG. 3 where the two rounded areas oppose one another. This facilitates hanging the device over a truss, since in the open position, the device can be lowered onto the truss, without the bottom portions interfering with the lowering of the truss. This is facilitated by the According to embodiments, the pickup bar can be formed in different sizes including 20.5 inches, 24 inch, 30 inch, or any other size to fit a standard size truss, thereby pressing and hinging the rounded area 230 into adjacency with supports of the truss.

Figure 5A:
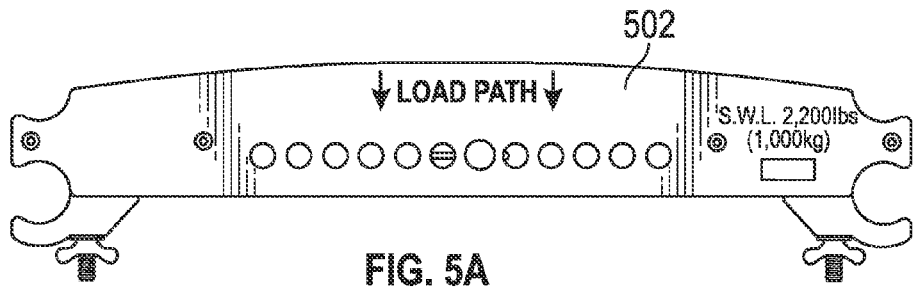
FIGS. 5A-5E show different size truss bars, and their hole configurations.
Figure 5B:
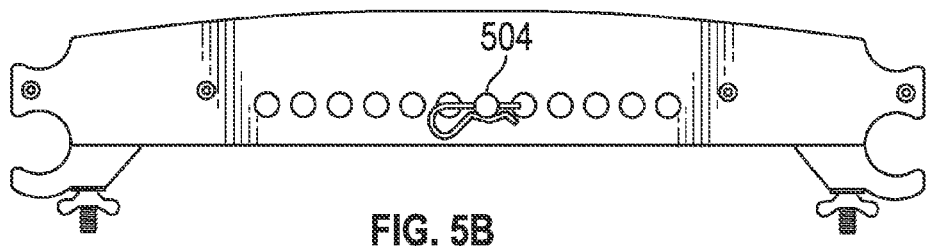

The holes that hold the Shackle are intentionally off-center so that the center post of the Shackle can be held between the two holes and centered in between those two holes. In different embodiments, there can be different numbers of holes, to allow the shackle to be located in the different locations. In one embodiment, the engraving on the device explains the load path, to facilitate the users using this properly. FIGS. 5A and 5B, for example, show the etching on two different sides of the 30 inch bar. The words "load path" are shown as 502 on one side of the device, showing also the location where the Cotter pin 504 is located through the device.

Figure 5C:
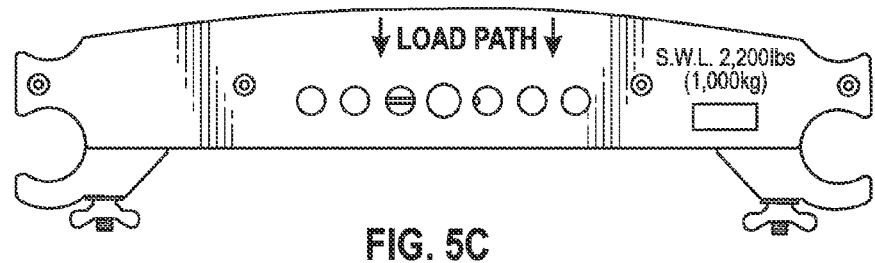
Figure 5D:
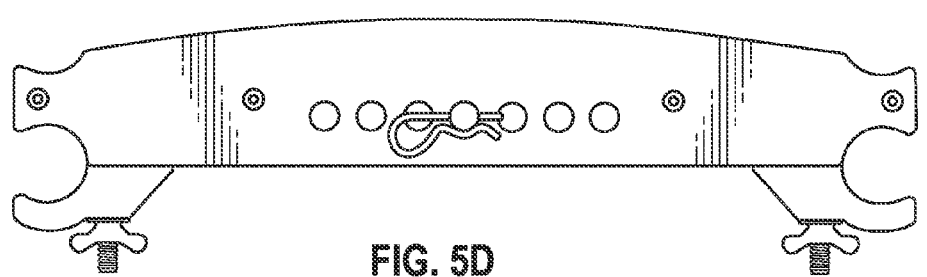
Figure 5E:
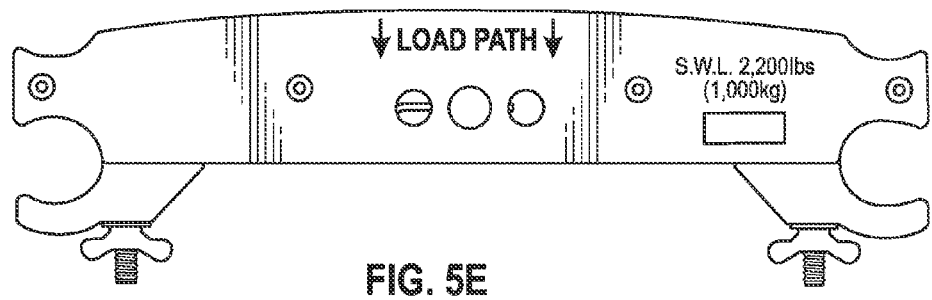

FIGS. 5C and 5D show the hole dimensions for the 24 inch bar, and FIG. 5E shows the hole placement and dimensions for the 20½ inch bar.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device, comprising:
   a plate having first and second ends, and a top surface, and a bottom surface, said bottom surface having a first curved portion located at said first end, and having a second curved portion located at said second end, where first and second curved portions are concave portions on said bottom surface;
   said plate having a connection part;
   a clamp portion, coupled to said connection part, having a first movable part with a first movable curved portion located to face to said first curved portion, which is movable both toward and away from said bottom plate and also toward and away from said first end and said first curved portion on said plate, including being movable in a first direction that causes said first movable curved portion to move vertically relative to said first curved portion, a movable in a second direction that causes said first movable curved portion to move horizontally relative to said first curved portion, and said clamp portion having a second movable part with a second movable curved portion located to face to said second curved portion, which is movable both toward and away from said bottom plate and also toward and away from said second end first end and said second curved portion on said plate, including being movable in said first direction that causes said second movable curved portion to move vertically relative to said second curved portion, a movable in said second direction that causes said second movable curved portion to move horizontally relative to said second curved portion, closer to one another, and to move towards and away from said first curved portion in a second direction that causes said first curved portion and said clamp first curved portion to be horizontally closer to one another, and the second clamp portion,
   where in an unclamped position, said first and second moveable parts are in a location that is inwardly spaced from said first and second curved portions in a way such that said first and second curved portions can be lowered on to respective trusses, and where in a clamped position, said first and second movable parts clamp and hold bottom surfaces of said respective trusses.

2. The device as in claim 1, wherein said first and second clamp portions, slide along a slot defined relative to said plate to move in said second direction.

3. The device as in claim 1, wherein said first and second curved portions and said first and second movable curved portions are sized to hold against a support bar of a truss.

4. The device as in claim 1, wherein said clamp portions are moved in said first direction by loosening and tightening a bolt that is connected between said plate and said clamp portions.

5. The device as in claim 1, further comprising a second plate, where said plate, herein being called a first plate, and said first plate and said second plate collectively form a plate assembly, with a space defined between said first and second plates.

6. The device as in claim 1, further comprising a load holding portion on said plate.

7. The device as in claim 1, wherein said load holding portion holds a chain hoist.

8. The device as in claim 1, wherein said curved portions each define less than 120° of an arc of a circle.

9. The device as in claim 1, wherein the plate is sized to connect to two different supports of a truss without extending beyond the horizontal extent of the truss.

10. A truss and device, comprising:
    a truss having first and second supports;
    a plate having first and second ends, and a top surface, and a bottom surface, said bottom surface having a first curved portion located at said first end, and having a second curved portion located at said second end, where first and second curved portions are concave portions on said bottom surface that are spaced to press against said first and second supports of said truss;
    a clamp portion, coupled to said plate, having a first movable part with a first movable curved portion located to face to said first curved portion, which is movable in two orthogonal directions relative to said first curved portion on said plate, including being movable in a first direction that causes said first movable curved portion to move vertically relative to said first curved portion, a movable in a second direction that causes said first movable curved portion to move horizontally relative to said first curved portion, and said clamp portion having a second movable part with a second movable curved portion located to face to said second curved portion, which is movable in said two orthogonal directions relative to said second curved portion on said plate, including being movable in said first direction that causes said second movable curved portion to move vertically relative to said second curved portion, a movable in said second direction that causes said second movable curved portion to move horizontally relative to said second curved portion, closer to one another, and to move towards and away from said first curved portion in a second direction that causes said first curved portion and said clamp first curved portion to be horizontally closer to one another, and the second clamp portion, where both said first movable part and said second movable part of said clamp portion, when moved to innermost horizontal positions, do not interfere with said plate being lowered onto said truss portion, and where in a clamped position, said first and second movable parts clamp and hold bottom surfaces of said respective trusses.

11. The device as in claim 10, wherein said first and second clamp portions slide along a slot defined relative to said plate to move in said second direction.

12. The device as in claim 10, wherein said clamp portions are moved in said first direction by loosening and tightening a bolt that is connected between said plate and said clamp portions.

13. The device as in claim 10, further comprising a second plate, where said plate, herein being called a first plate, and said first plate and said second plate collectively form a plate assembly, with a space defined between said first and second plates.

14. The device as in claim 10, further comprising a load holding portion on said plate, and a load on said load holding portion.

15. The device as in claim 14, wherein said load is held completely within an outer extent defined by outer supports of said truss.

16. The device as in claim 10, wherein said load is a chain hoist.

17. The device as in claim 10, wherein said curved portions each define less than 120° of an arc of a circle.

\* \* \* \* \*